United States Patent [19]

Barnett

[11] Patent Number: 4,690,040

[45] Date of Patent: Sep. 1, 1987

[54] SNAP-IN SCREEN FRAME AND MOUNTING FOR SAME

[75] Inventor: Timothy J. Barnett, Anaheim, Calif.

[73] Assignee: Elixir Industries, Gardena, Calif.

[21] Appl. No.: 866,707

[22] Filed: May 27, 1986

[51] Int. Cl.$^4$ .............................................. B60H 1/26
[52] U.S. Cl. ...................................... 98/2.14; 49/369
[58] Field of Search .................. 98/2.14, 42.14, 42.16, 98/88.1; 160/369; 296/216, 223

[56] References Cited

U.S. PATENT DOCUMENTS

| 3,170,507 | 2/1965 | Kleinknecht | 160/369 |
| 3,587,443 | 6/1971 | Rapport | 98/114 |
| 4,038,911 | 8/1977 | Hart | 98/2.14 |
| 4,104,825 | 8/1978 | Hosmer | 49/324 |

FOREIGN PATENT DOCUMENTS 470611  9/1975  Australia .......................... 160/369

Primary Examiner—Harold Joyce
Attorney, Agent, or Firm—Gausewitz, Carr & Rothenberg

[57] ABSTRACT

An improved ventilation opening having a separate screen frame which is attached to the ventilation opening by pawls mounted on pawl arms, with the pawls inserted into pawl receiving openings in a crossbar on the ventilation opening and having means to more positively retain the pawls within their respective pawl openings.

23 Claims, 10 Drawing Figures

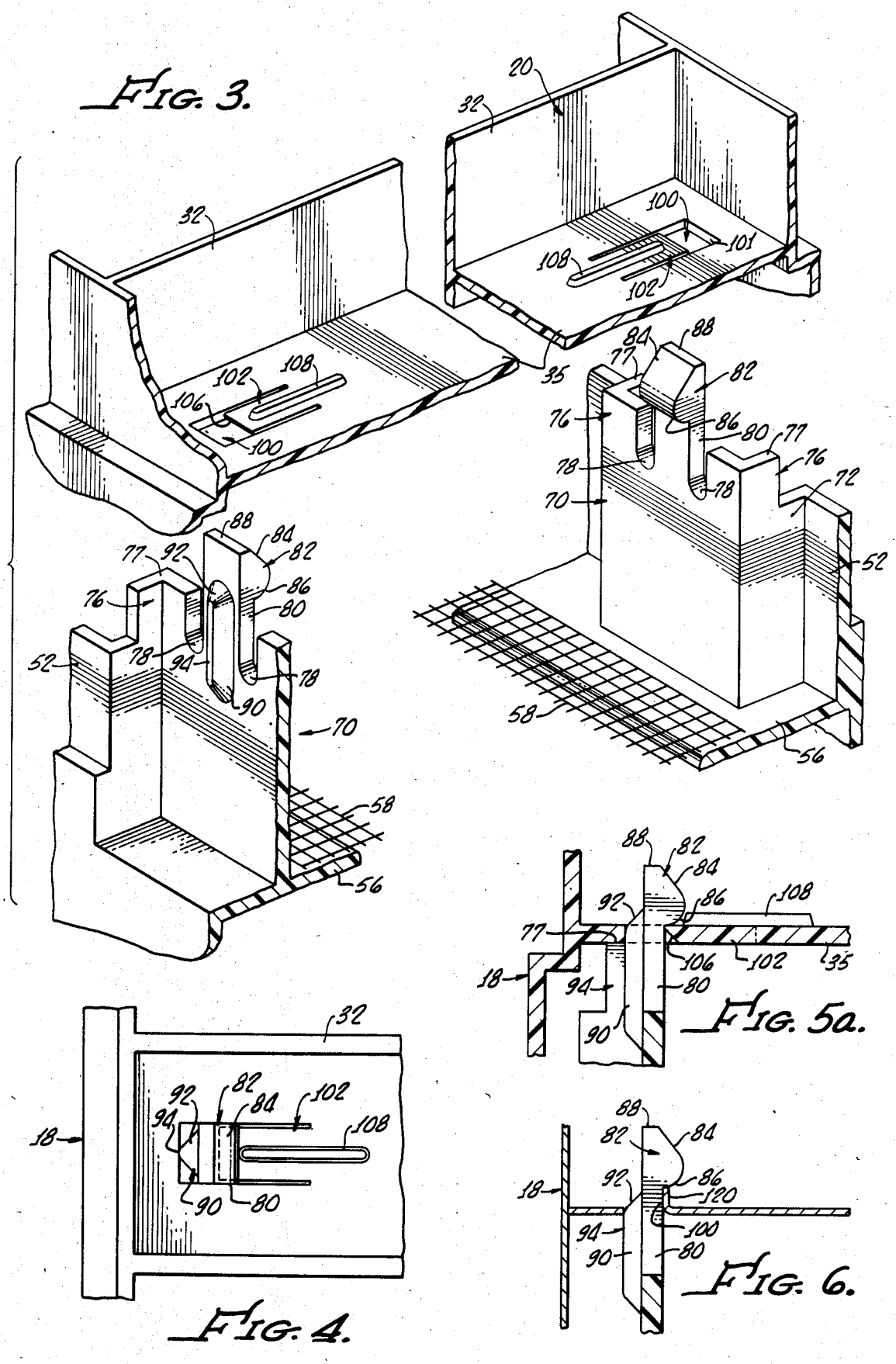

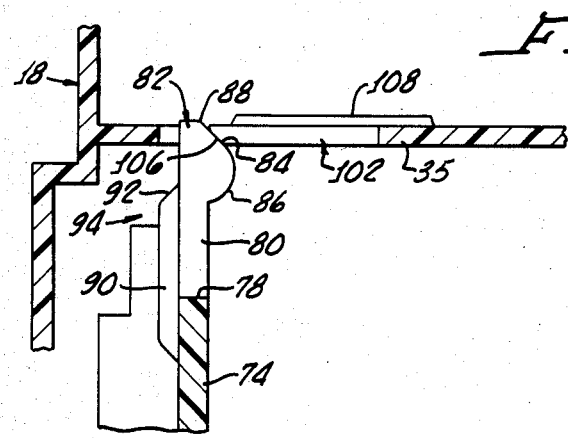
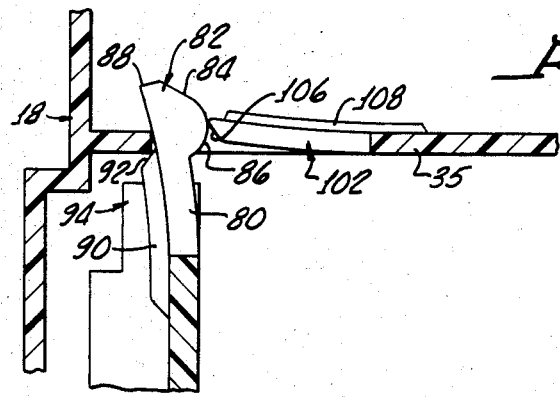
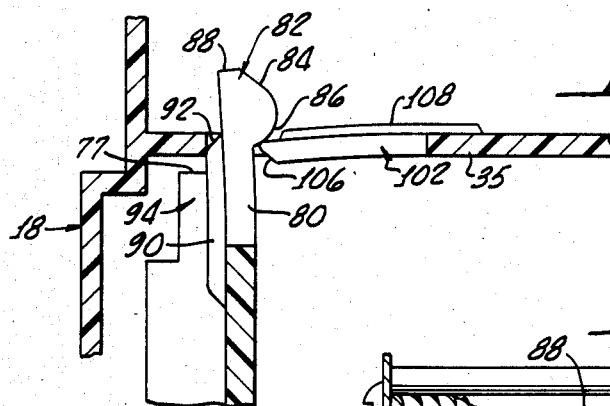
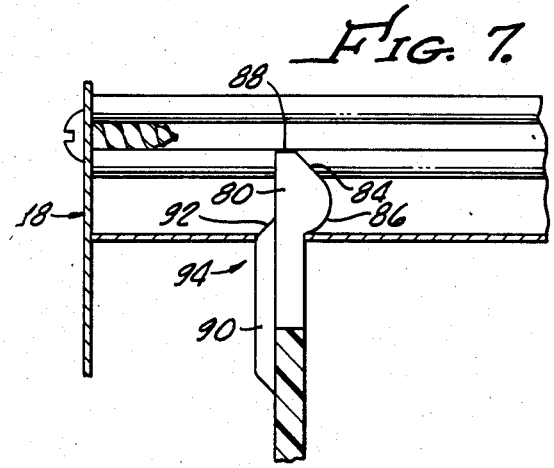

4,690,040

SNAP-IN SCREEN FRAME AND MOUNTING FOR SAME

The present application is related to design patent application Ser. No. 794,430, filed on Nov. 4, 1985, and assigned to the assignee of the present invention.

FIELD OF THE INVENTION

The present invention relates to the field of screen ventilation openings, particularly those employed in vehicles, such as vans, campers, trailers, motor coaches, small boats, and the like.

BACKGROUND AND SUMMARY OF THE INVENTION

Recreation vehicles, such as campers, trailers, motor vans, motor coaches, small boats, and the like, are commonly provided with ventilation devices to provide for interior ventilation both during vehicle motion and when the vehicle is at rest. Such ventilation openings may be seen by way of example in U.S. Pat. Nos. 3,587,443 and 4,038,911, assigned to the assignee of the present invention, the disclosures of which are hereby incorporated by reference.

Such ventilators typically include a ventilation opening mounting which is affixed in some way to the vehicle in question to cover a hole formed in the vehicle of like size and shape to the ventilation opening mounting. The ventilation opening mounting in turn has attached to it a pivoted cover and an operating mechanism for operating the cover to position the cover in any of the plurality of selected positions between fully opened and fully closed. The ventilation mounting also has attached to it a screen which serves the purpose of preventing the entry of unwanted insects and the like into the vehicle through the ventilation opening when the cover is in any of its open positions. In U.S. Pat. No. 3,587,443, a screen adapter is connected to the ventilation opening mounting by screws, and in addition, a screen frame is snap-locked into the screen adapter by a pair of latch members which contain pawls at the end thereof, each of which engages a respective lip formed to extend outwardly from the side wall of the screen adapter. The apparatus shown in U.S. Pat. No. 4,038,911 attaches a screen frame to the ventilation opening mounting by screwing the screen frame into a support bar which extends across the ventilation opening.

These ventilation openings and their associated screens are generally not high priced items, and any saving in the construction and/or assembly time of such apparatus can markedly improve the percentage of profit available from the sale of such items. While the apparatus shown in the U.S. Pat. No. 4,083,911 is certainly very rugged and durable, the manufacturing time necessary for fitting the pieces together and screwing in the necessary screws to attach the screen to the entire assembly is a labor intensive portion of the manufacturing process, which is desirably cut down or eliminated entirely. With respect to the apparatus of U.S. Pat. No. 3,587,443, there also exists the necessity for screwing in order to attach the screen adapter in order to thereafter attach the screen.

It has also been found, that the snap locking arrangement for the apparatus shown in that patent is not entirely satisfactory. The pawl and lip arrangement is not as strong as is desirable, especially if the vehicle owner removes the screen frame for cleaning the screen. After several such cycles, the arm containing the snap lock tends to become weakened or permanently deformed causing the latch members to improperly engage the engaging lips, resulting in the screen tending to become dislodged from the vent or to rattle excessively.

The above-noted deficiencies of and problems with the prior art are not intended to be exhaustive, but rather are intended to illustrate that the existing vehicle vents in the art are not entirely satisfactory.

Recognizing the need for an improved vehicle vent, and particularly, an improved means for securing the screen frame in place in a vehicle vent, it is the general object of the present invention to provide an improved vehicle ventilation opening and means for attaching the screen frame to the ventilation opening.

A feature of the present invention resides in providing a support bar connecting opposite walls of the ventilation opening in which are positioned pawl openings for receiving pawls on the ends of pawl arms mounted to the screen frame with the pawl arms being equipped with a spine on the surface of the pawl arm opposite from that containing the pawl. The spine serves a dual function of bracing the flexible pawl arm during insertion of the pawl into the pawl opening, and blocking deflection of the pawl arm, once the pawl has passed through the pawl opening, which deflection would be sufficient to disengage the pawl from the pawl opening.

A further feature of the present invention in one embodiment thereof resides in forming the ventilation opening, including the support, from plastic and providing in the pawl opening a flexible pawl opening tongue which has a spine performing a bracing function like that of the pawl arm spine.

Still another feature of the present invention is a sloping surface on the pawl arm spine at the terminal end thereof, which facilitates entry of the pawl arm and the pawl arm spine into the the pawl arm opening as the pawl arm is deflecting sufficiently to allow the pawl to clear the pawl opening. The pawl arm is deflected prior to the pawl snapping into a mated position with the pawl extending above the surface of the support bar adjacent the pawl opening.

A still further feature of the present invention is the provision of a ramped surface on the pawl opening tongue to facilitate both deflection of the pawl opening tongue and movement of the pawl into the pawl opening during the insertion of the pawl into the pawl opening.

Still another further feature of the present invention is the provision of shoulder members on either side of the pawl arm having abutting surfaces which abut the support bar when the pawl is in the mated position.

These and other features will be better understood by those skilled in the art by reference to the detailed description of the preferred embodiments contained below, and with reference to the attached drawing, in the figures of which, like references numerals, have been used to identify like elements.

BRIEF DESCRIPTION OF DRAWINGS

FIG. 3 shows a partially cut-away exploded view of the pawl arms and pawl openings according to one embodiment of the present invention;

FIG. 4 is a top view of a pawl as shown in FIG. 3 engaged within a pawl opening and also as shown in FIG. 3;

FIG. 5a is a side view partially cut away of the engaged pawl as shown in FIG. 4, and FIGS. 5b, 5c and 5d illustrate the entry of the pawl into and through the pawl opening to the mated position shown in FIG. 5a;

FIG. 6 is a view similar to that shown in FIG. 5a, utilizing an alternative embodiment of the present invention including a metal support bar, with the metal support bar being bent upwardly on the pawl side of the pawl opening to form a pawl engaging lip; and FIG. 7 is a view similar to that shown in FIG. 5a utilizing a further alternative embodiment including a metal support bar with no lip on the pawl opening.

DETAILED DESCRIPTION OF THE PREFERRED EMBODIMENTS

Figures 1, 2:
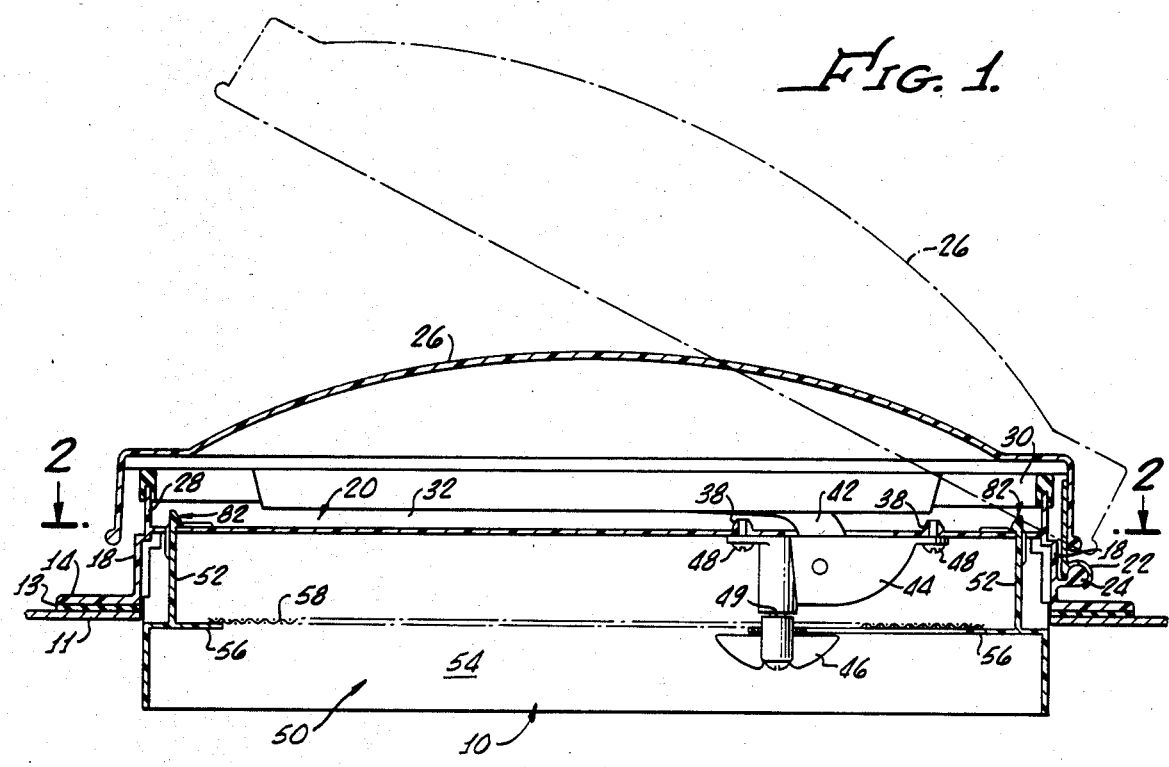
FIG. 1 shows a cross sectional view taken along lines 1—1 of FIG. 2, with additional elements not illustrated in FIG. 2, and illustrates a ventilation opening with its cover and its attachment to the vehicle, which ventilation opening employs the improved means for attaching the screen frame to the ventilation opening frame according to the present invention.
FIG. 2 is a top view taken along lines 2—2 of the FIG. 1 with the cover and the cover gasket of FIG. 1 removed in order to better illustrate elements of the present invention.

Turning now to FIG. 1, there is shown a vehicle vent 10 according to the present invention. The vehicle vent 10 is attached by suitable means, for example, by screws or rivets, to a vehicle body 11. The vent 10 has a ventilation mounting 12 which has an external flange 14. The flange 14 and vehicle body 11 are separated and sealed by a gasket 13, with the screws or rivets passing through the flange 14, the gasket 13 and the ventilation body 11, in order to attach the ventilation mounting 12 to the vehicle body 11.

The ventilation mounting 12 has two opposing ventilation mounting side walls 16 and two opposing ventilation mounting side walls 18. The ventilation mounting side walls 18 are connected by a crossbar 20, shown in more detail in FIGS. 2 and 3. The ventilation mounting 12 also has attached to it a hinge member pivot 24, which extends generally along the entire length of one of the ventilation mounting side walls 18. The hinge member pivot 24 has attached to it, for pivotal movement, a hinge member 22 which is connected to a cover 26 so that the cover may be pivoted between a closed position as shown in FIG. 1 and an open position as shown in phantom in FIG. 1. A gasket flange 28 extends around the upper periphery of the ventilation mounting 12 and has attached to it a cover gasket 30 which serves to seal the cover 26 when the cover 26 is in the closed position.

The ventilation mounting 12 is formed from a solid piece of molded plastic with the side walls 16, 18 forming a first generally rectangular portion which terminates in a surface 31. Extending upwardly from the surface 31 are additional portions of the side walls 16, 18 formed with rounded corners, as shown in FIG. 2. Extending inwardly from the portions of the side walls 16, 18, having the rounded corners, is a flange 33. The flange 33 is in the shape of an "L" extending perpendicularly from the portions of the side walls 16, 18 having the rounded corners, and then into the paper as shown in FIG. 2, terminating in the plane of the upper most extension of the generally rectangularly shaped portion of the side walls 16, 18. The L-shaped extension forms a skirt on the flange 33. Between the skirt of the flange 33 and the portions of the side walls 16, 18 having the rounded corners extend structural support braces (not shown) at intervals along the skirt.

The crossbar 20 is generally H-shaped in cross section, having side walls 32 upstanding from opposite sides of a channel web center portion 35, with the side walls 32 extending downwardly in the other side of the web center portion 35 as illustrated at 32a in FIG. 3. The crossbar side walls 32 extend perpendicularly to the plane of the portion of the side walls 18 having the rounded corners and the plane of the skirt on the portion of the flange 33 extending from the portion of the side walls 18 having the rounded corners. The side walls 32 extend below the plane in which the skirt terminates. The crossbar 20 has a crossbar center portion 35 extending between the crossbar side walls 32 with a lower surface generally co-planer with the plane in which the skirt on the flange 33 terminates, and having an upper surface giving the crossbar center portion 35 a thickness of approximately 3/32 of an inch. The upper surface of the crossbar centerpiece is formed with a pair of nipples 38 having a bore for receiving screws 48 which attach an operating lever mechanism 44 to the crossbar centerpiece 35. The operating lever mechanism 44 has an operating lever 42 which passes through an operating lever opening 40 formed in the crossbar centerpiece 35. The operating lever mechanism 46 is operated by a wing nut 48 attached to an operating mechanism shaft 49. The operating lever 42 is pivotally attached to the cover 26, for pivoting the cover about the hinge member pivot 24 in response to movement of the operating lever 42.

A screen frame 50 is formed in a shape to fit within a portion of the vent mounting side walls 16, 18 having a rectangular shape. The screen frame 50 has screen frame side walls 52, 54 which correspond to the side walls 16, 18 of the vent mounting 12. The screen frame 50 has a peripheral flange 56 extending inwardly from the screen frame side walls 52, 54 in a plane generally parallel with the plane of the flange 33 on the vent mounting 12. A screen 58 is attached to the flange 56 by heat and pressure which serves to melt the plastic of the flange 56 sufficiently to allow the pressure to press the screen 58 into the softened plastic, which thereafter hardens sufficiently to hold the screen 58 in place on the flange 56.

Turning now to FIG. 3, it can be better seen that extending upwardly from the flange 56, at opposing locations on the flange 56 adjacent the side walls 52, are formed pillar members 70. The pillar members 70 have side walls 72 extending inwardly from the side walls 52 and a front wall 74 which has an innermost surface in a plane generally parallel to the plane of the side walls 52. Formed on the pillar members 70 are a pair of L-shaped shoulder members 76 which form an extension of portions of the side wall 72 and front wall 74. The L-shaped shoulder members 76 have an abutting surface 77.

A pair of U-shaped cut outs 78 separate the juncture of a pawl arm 80 from the shoulder members 76. The pawl arm 80 has a pawl 82 formed at the terminal end thereof, with each pawl 82 extending outwardly from a juncture of the pawl 82 with the inwardly facing surface of the pawl arm 80, toward the other pawl 82. The pawl 82 is formed with a generally flat, sloped deflecting surface 84 which extends from an end surface 88 at the terminal end of the pawl arm 80 outwardly from the plane of the outermost surface of the pawl arm 80 to a juncture with a generally curved recoil surface 86 extending from the juncture of the pawl 82 with the innermost surface of the pawl arm 80. FIG. 5a shows that the plane of the abutting surfaces 77 is spaced from the juncture of the pawl 82 and the innermost surface of the pawl arm 80, such that when the pawl 82 is in the mated position the abutting surfaces are abutting the facing surface of the web center portion 35.

A spine 90 is formed on the outermost surface of the pawl arm 80, and extends beyond the juncture of the pawl arm 80 and the pillar member 70 sufficiently to brace and reinforce the pawl arm 80 such that deflection of the pawl arm 80, under normal operation, does not significantly weaken nor permanently deform the plastic material of the pawl arm 80 and the region of the juncture of the pawl arm 80 with the pillar member 70. The spine 90 is formed with half frustoconical ends and elongated side walls joining the half frustoconical portions, with the frustoconical portions terminating in a generally flat surface, which are connected by an elongated generally flat surface 94 extending along the length of the spine 90. Thus, the end of the spine 90 at the pawl 82 end of the pawl arm 80 forms a ramped surface 92, when viewed from the side as shown in FIGS. 5 and 6. The spine also contains the flat surface 94, when viewed from the side as shown in FIGS. 5 and 6. The purpose of the ramp surface 92 and flat surface 94 will be explained below.

Formed at opposite ends of the crossbar 20 center portion 35 are rectangular pawl openings 100. Extending into each of the rectangular pawl openings 100 is a pawl opening tongue 102 which lies generally coextensive with the planes of the inner and outer surfaces of the crossbar 20 center portion 35. On the inner surface of the pawl opening tongue 102 is a pawl opening tongue spine 108, which extends beyond the juncture of the pawl opening tongue 102 and the crossbar 20 center member 35 and onto the inner surface of the crossbar 20 center portion 35. As can be seen in more detail in FIG. 5a, the pawl opening tongue 102 has a sloped surface 106 which slopes such that the inner surface of the pawl opening tongue 102 extends further toward the side wall 18 than does the outer surface of the pawl opening tongue 102.

The spine 90, sloping surface 92 extends outwardly from the outwardly facing surface of the pawl arm 80 at at point generally collateral with the maximum extension of the pawl 82, i.e., at approximately the juncture of the deflecting surface 84 and recoil surface 86 of the pawl 82. The spine 90, flat surface 94 commences at a point approximately collateral with the juncture of the recoil surface 86 of the pawl 82 and the inwardly facing surface of the pawl arm 80.

The operation of the fastening mechanism according to the present invention can be better understood with reference to FIGS. 5a, 5b, 5c and 5d. In FIGS. 5b, 5c, 5d and 5e, actual amounts of deflection have been exaggerated somewhat for purposes of illustration. To attach the screen 58 and its frame 50 to the ventilation mounting 12, it is only necessary to move the screen frame 50 to the crossbar 20 to simultaneously snap the two pawls 82 into the respective pawl openings 100. As the pawl 82 begins to be inserted into the respective pawl opening 100, the deflecting surface 84 of the pawl 82 engages the ramped surface 106 of the pawl opening tongue 102, and deflects the pawl opening tongue upwardly to facilitate passage of the pawl 82 through the pawl opening 100. The pawl 82 itself deflects away from the pawl opening tongue 102. During insertion of the two pawls, each pawl arm 80 deflects outwardly because the screen frame 50 is restrained from outward motion by the similar and concurrent action of the other pawl 82. Even when the pawls 82 are inserted independently, the holding of the screen frame 50 during upward thrusting tends to prevent sidewise motion of the pawl 82 relative to the pawl opening 100, resulting in the bending of the pawl arm 80 as described. At approximately the same time that the pawl opening tongue 102 reaches the juncture of the deflecting surface 84 and recoil surface 86, and thus, begins to slide back along the recoil surface 86 towards the innermost facing surface of the pawl arm 80, the ramped portion 92 of the spine 90 begins to enter the pawl opening 100, as shown in FIG. 5c. The pawl arm 80, at the same time, is beginning to recoil from its deflection, providing more and more space for the pawl arm spine 90 to enter the pawl opening 100. The pawl opening tongue 102 moves along the recoil surface 86 and recoils to a position slightly beyond its original undeflected position, as shown in FIG. 5d. Recoiling back in the opposite direction to its original undeflected position, the pawl opening tongue 102 actually aids in pushing the pawl 82 into the pawl opening 100. By the time the pawl 82 is in the mated position shown in FIG. 5a, the maximum extension of the spine 90 is within the pawl opening with the generally flat elongated surface 94 of the spine 90 engaging a surface 101 (shown in FIG. 3) of the pawl opening 100. In this manner, the spine 90 serves to hold the pawl arm 80 in a position which prevents deflection of the pawl arm 80 sufficiently to allow the pawl 82 to pass through the pawl opening 100. Thus, the pawl 82 is firmly secured in position, having both inner and outer sides in abutment with the pawl opening 100, and having abutting surfaces 77 in contact with the lower surface of web 35, thereby further stabilizing the parts in assembled condition.

It will be understood, that if a sufficiently large downward force is exerted on the screen frame 50, to move the screen frame 50, the pawl opening tongue 102 will deflect sufficiently to free the pawl 82 from the pawl opening 100. However, absent the exertion of such large force, the portion of the spine 90 on the pawl arm 80, in combination with the width of the pawl arm 80 itself, serves to generally fill the gap between the terminal end of the pawl opening tongue 102 and the surface 101 of the pawl opening 100. This serves to lessen, or prevent, vibration of the screen frame 50 due to vibration of the vehicle in which the vent 10 is placed. It also serves to prevent the pawl 82 from slipping out of the pawl opening 100.

In assembled position, the spine 94 extends upwardly to a region above the lower surface of the crossbar 20 center web portion 35, so as to abut the pawl opening wall 101 on this side, firmly holding the pawl 82 in its mated position over the tongue 102. However, the spine tapered surface 92 begins at or below the crossbar 20 upper surface so that with a small amount of downward motion of the pawl 80 and pawl arm 82, the latter is freed to move outwardly, away from the tongue 102, to permit detachment of the screen frame 50. This distance between the plane of the wedging surface 94 of the spine 90 and the first surface of the pawl arm 80 is at least equal to the distance in the same direction between the first surface of the pawl arm 80 and the maximum extension of the pawl 82 from the first surface of the pawl arm 80, and is approximately equal to the width of the pawl opening 100 in the same direction.

The spine 108 on the pawl opening tongue serves a bracing function similar to that of the spine 90 on the pawl arm 80. The pawl opening tongue spine 108 is formed of a shape generally the same as that of the spine 90 on the pawl arm 80, except that the spine is somewhat thinner in transverse cross section. The spine 108 also has walls extending from the outer surface of the crossbar 20 center portion 35 to a somewhat lesser degree than the extension of the spine 90 out of the plane of the outwardly facing surface of the pawl arm 80. Further, the side walls of the spine 108 are somewhat less sloped. The pawl opening tongue spine 108 serves only the bracing function, and therefore, does not need to be sized and shaped to a degree that it extends sufficiently to fill a certain gap, as is the case with the spine 90 on the pawl arm 80.

It will be understood, that the vent mounting 12 and/or the crossbar 20, according to the present invention, may also be formed of metal, although the configuration shown in FIGS. 1-5 is preferably made in a stiff resilient plastic. A metal crossbar preferably will have the form shown in FIGS. 6 and 7. The material, configuration and construction of the screen frame and its pawl and pawl arms, for use with the crossbar of FIGS. 6 and 7 are precisely the same as previously disclosed with the pawl arms differing somewhat as described below. The crossbar center portion 35, in FIG. 6, is metallic and has a generally rectangular opening with a lip 120 formed on an edge of the opening. The lip 120 is optional and the pawl opening in the embodiment shown in FIG. 6 could simply be formed with the center portion 35 terminating to form one side of the pawl opening 100 (without lip 120), as shown in FIG. 7. In the embodiment shown in FIG. 6, it may be necessary to position the point where the spine 90 extends outwardly from the outwardly facing surface of the pawl arm 80 to a point generally collateral with a point along the recoil surface 86 of the pawl 82, approximately midway between the juncture of the deflecting surface 84 and the recoil surface 86, and the juncture of the recoil surface 86 and the inwardly facing surface of the pawl arm 80 (e.g., further downwardly along the pawl arm 80, relative to the pawl 82, as compared with the pawl 82 and spine 90 shown in FIG. 5.). This is so that the pawl arm 82 is sufficiently into its recoil into the mated position shown in FIG. 6 at the point when the sloped portion 92 of the spine 90 is entering the pawl opening 100, which enables the combined thickness of the spine 90 and pawl arm 80 to clear the pawl opening as the pawl arm 80 is recoiling to a position as shown is FIG. 6. In its position shown in FIG. 6, the pawl 82 is engaging the lip 120, and the generally flat surface 94 of the pawl arm spine 90 is engaging the side wall of the pawl opening 100, oppositely disposed from the lip 120.

SUMMARY OF THE SCOPE AND ADVANTAGES OF THE INVENTION

The screen frame mounting for a ventilation opening according to the present invention is inexpensive to manufacture and simple to install. It provides a more positive engagement between the screen frame and the ventilation mounting to which screen frame is snap-fitted. The snap-fit arms and snap-fit opening tongues are braced with spines to positively hold the pawl 82 in its mated position with the pawl 82 over the engaging portion of the pawl opening 101, e.g., the pawl opening tongue 102, and to lessen the likelihood of permanent deformation of the plastic thereof during assembly of the screen frame to the screen frame mounting or by subsequent removals and replacements thereof.

Those skilled in the art will appreciate that there are modifications and changes to the embodiments illustrated herein which would still come within the spirit and intent of the present invention. The applicant desires to cover all such modifications and changes as come within the true scope and content of the apended claims.

What is claimed is:

1. A screen frame attaching apparatus for attaching a screen frame into a ventilation opening housing having a support bar extending between first and second opposing side walls of the ventilation opening housing corresponding to first and second opposing side walls of the screen frame, comprising:
   a first and a second pawl arm each connected to a respective one of the screen frame first and second side walls, and extending above a rim defining the terminus of the respective side wall of the screen frame, each pawl arm having a first surface and an opposing second surface;
   a pawl extending from the respective first surface outwardly beyond the plane of the first surface;
   a first and second pawl receiving opening positioned at opposing ends of the support bar and shaped and positioned to receive a respective one of the pawls, and such that movement of the respective pawl into the respective pawl opening deflects the respective pawl arm resulting in the respective pawl snapping into a mated position when the respective pawl clears the respective pawl opening; and
   cooperating means on the opposing second surface of the pawl arm for cooperating with the pawl opening for restraining lateral deflection of the pawl arm from its mated position, to thereby hold the pawl arm in its mated position.

2. The apparatus of claim 1 wherein the cooperating means comprises a protrusion from the opposing second surface having a size and shape to allow entry into the respective pawl opening during deflection of the respective pawl arm, and to extend in relation to the pawl opening sufficiently to block deflection of the respective pawl arm after the respective pawl has snapped into the mated position, which deflection would be sufficient to allow the respective pawl to clear the respective pawl opening resulting in unmating the respective pawl from its respective pawl opening.

3. The apparatus of claim 2 wherein the protrusion comprises a longitudinal spine extending from the opposing second surface of the pawl arm across the juncture of the pawl arm and the corresponding surface of the respective screen frame side wall.

4. The apparatus of claim 1 wherein:
   the screen frame is formed of a plastic piece and the first and second side walls of the screen frame have interior facing surfaces; and further comprising
   a first and a second pillar member formed as a protrusion from the respective interior facing surface of each of the screen frame first and second side walls, with each respective pillar member having an interior facing surface;
   a pair of shoulder members on each respective pillar member each having an interior facing surface and an abutting surface;
   the respective pawl arm being formed on the respective pillar member with its first surface generally parallel to the plane of the interior facing surface of the respective pillar member, with a juncture between the respective pawl arm and the respective pillar member located below the abutting surfaces of the respective shoulder members, and spaced from the respective shoulder members;

a respective pawl arm spine extending beyond the abutting surfaces of the respective shoulder members; and the juncture of the respective pawl with the first surface of the respective pawl arm being displaced from the abutting surfaces of the respective shoulder members sufficiently that the respective pawl snugly engages a first surface of the support bar in which the respective pawl opening is formed when the opposing surface of the support bar is abutting the abutting surfaces of the shoulder members.

5. The apparatus of claim 4 wherein:

each respective pawl opening is formed with a lip extending above the first surface of the support bar; and the juncture of the respective pawl with the respective first surface of the pawl arm is displaced sufficiently from the respective abutting surfaces of the respective shoulder members such that the respective pawl snugly engages the respective pawl opening lip when the opposite surface of the support bar abuts the respective abutting surfaces of the respective shoulder members.

6. The apparatus of claim 1 wherein:

the ventilation opening housing, including the support bars, is formed of plastic; and each respective pawl opening in the support bar is formed with a pawl opening tongue lying generally coextensive with the support bar, the pawl opening tongue being deflectable and of a length sufficient that the pawl opening tongue will deflect to permit passage of the pawl through the pawl opening, and, once the pawl has passed through the pawl opening, the pawl opening tongue will snap into a generally abutting position with the pawl arm at generally the juncture of the pawl and the first surface of the pawl arm.

7. The apparatus of claim 5 wherein:

the housing, including the support bar, is formed of plastic; and each respective pawl opening in the support bar is formed with a pawl opening tongue lying generally coextensive with the support bar, the pawl opening tongue being deflectable and of a length sufficient that the pawl opening tongue will deflect to permit passage of the pawl through the pawl opening, and once the pawl has passed through the pawl opening, the pawl opening tongue will snap into a generally abutting position with the pawl arm at generally the juncture of the pawl and the first surface of the pawl arm.

8. The apparatus of claim 2 wherein;

the ventilation opening housing, including the support bars, is formed of plastic; and each respective pawl opening in the support bar is formed with a pawl opening tongue lying generally coextensive with the support bar, the pawl opening tongue being deflectable and of a length sufficient that the pawl opening tongue will deflect to permit passage of the pawl through the pawl opening, and, once the pawl has passed through the pawl opening, the pawl opening tongue will snap into a generally abutting position with the pawl arm at generally the juncture of the pawl and the first surface of the pawl arm.

9. The apparatus of claim 3 wherein:

the ventilation opening housing, including the support bars, is formed of plastic; and each respective pawl opening in the support bar is formed with a pawl opening tongue lying generally coextensive with the support bar, the pawl opening tongue being deflectable and of a length sufficient that the pawl opening tongue will deflect to permit passage of the pawl through the pawl opening, and, once the pawl has passed through the pawl opening, the pawl opening tongue will snap into a generally abutting position with the pawl arm at generally the juncture of the pawl and the first surface of the pawl arm.

10. The apparatus of claim 6, further comprising:

a pawl opening tongue spine on a first surface of the pawl opening tongue generally coextensive with the first surface of the support bar, with the pawl opening tongue spine extending beyond the juncture of the pawl opening tongue and the support bar onto the first surface of the support bar.

11. The apparatus of claim 10, further comprising:

a ramped surface joining the first surface of the respective pawl opening tongue and a second opposing surface of the respective pawl opening tongue, at the terminal end of the respective pawl opening tongue, and sloped such that the first surface of the respective pawl opening tongue extends closer to the respective pawl arm in the mated position of the respective pawl than does the second opposing surface of the respective pawl opening tongue.

12. The apparatus of claim 3 wherein:

each pawl is formed in a shape having a recoil surface extending from the juncture of the respective pawl with the respective pawl arm and a deflecting surface extending from the maximum extension of the respective pawl from the plane of the first surface of the respective pawl arm back towards the plane of the first surface of the respective pawl arm;

each pawl arm spine is formed with a ramped portion at the terminal end thereof extending towards the pawl end of the respective pawl arm, with the juncture of the ramped portion of the pawl arm spine and the second surface of the pawl arm being generally collateral with the juncture of the deflecting surface and recoil surface of the pawl; and each pawl arm spine having a wedging portion along the maximum extension of the respective pawl arm spine from the plane of the second surface, with the juncture of the sloping portion and the wedging portion of the respective pawl arm spine being approximately collateral with the juncture of the recoil surface of the respective pawl with the first surface of the respective pawl arm, with the width of the respective pawl arm and the respective pawl arm spine in the region of the wedging portion of the respective pawl arm spine being equal to or greater than the maximum extension of the respective pawl from the second surface of the respective pawl arm, and generally equal to the corresponding width of the respective pawl opening.

13. The apparatus of claim 12 wherein:

the juncture of the deflecting surface and recoiling surface of each respective pawl form a juncture region which is flat in a plane, or only slightly curvilinear out of the plane, parallel to the second surface of the respective pawl arm, such that the juncture of the sloping portion of the respective pawl arm spine and the second surface of the respective pawl arm is positioned within a range of positions collateral with the juncture region and thereby collateral with essentially the maximum extension of the respective pawl from the second surface of the respective pawl arm.

14. The apparatus of claim 6 wherein:
each pawl is formed in a shape having a recoil surface extending from the juncture of the respective pawl with the respective pawl arm and a deflecting surface extending from the maximum extension of the respective pawl from the plane of the first surface of the respective pawl arm back towards the plane of the first surface of the respective pawl arm;
each pawl arm spine being formed with a ramped portion at the terminal end thereof extending towards the pawl end of the respective pawl arm, with the juncture of the ramped portion of the pawl arm spine and the second surface of the pawl arm being generally collateral with the juncture of the deflecting surface and recoil surface of the pawl; and
each pawl arm spine having a wedging portion along the maximum extension of the respective pawl arm spine from the plane of the second surface, with the juncture of the sloping portion and the wedging portion of the respective pawl arm spine being approximately collateral with the juncture of the recoil surface of the respective pawl with the first surface of the respective pawl arm, with the width of the respective pawl arm and the respective pawl arm spine in the region of the wedging portion of the respective pawl arm spine being equal to or greater than the maximum extension of the respective pawl from the second surface of the respective pawl arm, the corresponding width between one end of the respective pawl opening and the maximum extension of the respective pawl opening tongue towards the one end of the respective pawl opening.

15. The apparatus of claim 14 wherein:
the juncture of the deflecting surface and recoiling surface of each respective pawl form a juncture region which is flat in a plane, or only slightly curvilinear out of the plane, parallel to the second surface of the respective pawl arm, such that the juncture of the ramped portion of the respective pawl arm spine and the second surface of the respective pawl arm is positioned within a range of positions collateral with the juncture region and thereby collateral with essentially the maximum extension of the respective pawl from the second surface of the respective pawl arm.

16. The apparatus of claim 15, further comprising:
a pawl opening tongue spine on a first surface of the pawl opening tongue generally coextensive with the first surface of the support bar, with the pawl opening tongue spine extending beyond the juncture of the pawl opening tongue and the support bar onto the first surface of the support bar.

17. The apparatus of claim 16, further comprising;
a ramped surface joining the first surface of the respective pawl opening tongue and a second opposing surface of the respective pawl opening tongue, at the terminal end of the respective pawl opening tongue, and sloped such that the first surface of the respective pawl opening tongue extends closer to the respective pawl arm in the mated position of the respective pawl than does the second opposing surface of the respective pawl opening tongue.

18. In a vent having a vent housing formed with side walls defining a vent opening, and having a screen mounting member, formed with side walls, with the screen mounting member being of a size and shape to fit within the side walls of the vent housing, the improvement comprising:
a support bar attached to opposing side walls of the vent housing having a first surface and an opposing second surface;
a first and a second pawl receiving opening formed generally at opposing ends of the support bar;
a first and a second pawl arm, each mounted on a respective one of the side walls of the screen mounting member corresponding to the opposing side walls of the vent opening, and each having a first broad surface and a second broad surface;
a pawl formed to extend out of the plane of the first broad surface of each respective pawl arm from a juncture of the respective pawl and the first broad surface of the respective pawl arm, and extending sufficiently to extend over a portion of the first surface of the support bar when the juncture of the respective pawl and the first surface of the respective pawl arm is positioned adjacent or beyond the first surface of the support bar; and
a pawl arm spine positioned on the second broad surface of each respective pawl arm and extending along the second broad surface of the respective pawl arm, and onto the adjoining surface of the respective screen mounting member side wall.

19. The apparatus of claim 18 wherein:
each respective pawl spine has a ramped surface at the end thereof on the second broad surface of the pawl arm in the region opposite from the position of the respective pawl, which ramped surface slopes outwardly from the respective second broad surface in a direction opposite from the direction of movement of the respective pawl through the respective pawl opening.

20. The apparatus of claim 19 wherein:
each respective pawl arm spine extends from the second broad surface of the respective pawl arm and forms a longitudinal wedging surface such that the distance between the longitudinal wedging surface and the first broad surface of the respective pawl arm is equal to or greater than the distance in the same direction between the first broad surface of the pawl arm and the maximum extension of the pawl from the first broad surface of the pawl arm, and substantially equal to the width of the respective pawl opening in that same direction.

21. A vehicle vent comprising:
a vent frame adapted to be mounted in an opening in the wall of a vehicle, the frame having a movably mounted vent cover, and a crossbar extending across the frame from one side of the frame to the other, the crossbar having screen frame attaching apertures therein at first and second ends thereof, and
a snap-in screen frame comprising:
a peripheral frame member extending around the periphery of the frame and having frame member portions adjacent the first and second crossbar ends respectively, and resilient attachment means for detachably connecting the screen frame to the crossbar, the attachment means comprising, at each said frame member portion:
- an upstanding support member protruding from the peripheral frame member, the upstanding support member having a free end positioned adjacent the crossbar,
- a resilient arm integrally formed with the upstanding support member projecting from said free end through a respective one of the attaching apertures of the crossbar, the arm including a lateral projection overlying an inner edge of the crossbar on the side thereof remote from the upstanding support member, and
- an elongated locking and reinforcing spine extending along each respective arm on the side thereof opposite the lateral projection, the spine having an outer surface pressed against a surface of the respective attaching aperture to thereby restrain the arm and the lateral projection thereof from being displaced from the inner edge of the respective crossbar attaching aperture.

22. The apparatus of claim 21 wherein the crossbar includes, on each end thereof, a resilient tongue lying in the plane of the crossbar and cantilevered therefrom into the respective attaching aperture, the resilient tongue having a free end in the attaching aperture, the respective lateral projection engaging and overlying the free end of the resilient tongue.

23. The apparatus of claim 22 wherein the resilient tongue is formed integrally with the crossbar, and including a reinforcing spine extending along the tongue from a point spaced from the free end thereof to a point inwardly of said free end beyond the cantilevered connection of the tongue to the crossbar.

* * * * *